United States Patent [19]

Kurokawa et al.

[11] Patent Number: 4,849,908
[45] Date of Patent: Jul. 18, 1989

[54] WORD PROCESSOR WITH A RULED LINE DISPLAY FUNCTION

[75] Inventors: Yuji Kurokawa; Hiroyuki Kikukawa, both of Nagoya; Hiroshi Shimizu, Yokohama; Tsutomu Inagi, Meguro, all of Japan

[73] Assignees: Brother Kogyo Kabushiki Kaisha; Hitachi Software Engineering Co., Ltd., both of Japan

[21] Appl. No.: 48,898

[22] Filed: May 12, 1987

[30] Foreign Application Priority Data

May 14, 1986 [JP] Japan .................. 61-110156
May 14, 1986 [JP] Japan .................. 61-110158

[51] Int. Cl.4 ............................. G06F 15/72
[52] U.S. Cl. ................... 364/518; 340/709; 340/730
[58] Field of Search ............... 364/518, 521; 340/730, 340/756, 709

[56] References Cited

U.S. PATENT DOCUMENTS 4,686,522 8/1987 Hernandez et al. ............... 340/709
4,760,458 7/1988 Watanabe et al. ............... 358/256

OTHER PUBLICATIONS

"MacDraw", Macintosh Reference Manual, pp. 10, 11, 21, 23, 30, 42, 49, 62, 70, 71, 74, 100 and 101.

Primary Examiner—Gary V. Harkcom
Assistant Examiner—Randy W. Lacasse
Attorney, Agent, or Firm—Oliff & Berridge

[57] ABSTRACT

A word processor that shows, on a display screen, in which place of a text a line will be drawn and, further, which kind of line will be printed out later. In a line ruler mode, the word processor displays a line pointing cursor instead of a normal cursor on the display screen. Here, the line pointing cursor has an arrowhead which points at one corner of the character region so as to indicate the starting point of a line to be ruled and has a line display portion in which a structure of line type to be printed by the printer is displayed.

7 Claims, 7 Drawing Sheets

WORD PROCESSOR WITH A RULED LINE DISPLAY FUNCTION

BACKGROUND OF THE INVENTION

The present invention relates to a word processor with a ruled line display function. Many word processors for inputting and editing a text can rule a line in the text for underlining or making a table when a line ruler mode is selected. Those word processors with a ruled line display function are designed so as to rule a line by following a leading cursor (line pointing cursor) which is movable in a text display screen of the display device. The display screen is designed to display ruled lines and characters separately in their respective regions; that is, there are regions for ruled lines and regions for characters. In general, the display screen is constructed of a gathering of many square or rectangular character regions arranged vertically and horizontally; that is, the screen is divided into rows and columns of character regions in which a letter or a symbol is displayed by selectively lighting a specific group of pixels (picture elements). Furthermore, many word processors have line display regions between the character regions.

Various methods of displaying the leading cursor in the line ruler mode have been proposed. For example, provision is made to display a cursor in the line ruler mode by a reverse display of a whole character region, and another provision is made to display a cursor by a reverse display of not the whole region but only the upper or lower half of a character region. However, a problem arising in the above methods is that the operator cannot see clearly where a line will be drawn at the beginning of ruling a line. More exactly, it is not apparent whether the starting point of a line is at the upper corner of the cursor in a character region or the lower corner thereof, and accordingly a line may be ruled on a different place from where desired.

When a display device of a word processor is small, another problem arises in respect to the line ruling on the display. The printer of the word processor can print various kinds of lines; such as a thin solid line, a thick solid line, a broken line, a chain line, and so on. However, the display screen cannot distinctively show each structure of line, because the allotted line display region is naturally small on the order of one-pixel-width. Therefore these lines are shown by a same solid line on the display and the kind of line selected by the operator for printing is displayed at a corner of the display screen for reference. The problem with such a word processor is that the operator cannot check immediately on the display screen which kind of line will be printed by the printing mechanism and that a different kind of line from the desired one may be mistakenly printed.

SUMMARY OF THE INVENTION

It is accordingly an object of the present invention to provide a word processor which indicates to an operator exactly where on a display device lines will be ruled and also which kind of line will be printed out later by the printing mechanism so that the operator may not make a mistake in inputting lines.

This object is attained by a word processor with a ruled line display function including a display, which has a plurality of rectangular character regions arranged vertically and horizontally and line regions on circumferences of each said character region, each character region being able to display a character, wherein the word processor further includes:

display controller for displaying a character or a line pointing cursor in one of the character regions, the line pointing cursor having a shape of an arrow with an arrowhead for pointing at one corner of the one of the character regions;

cursor controller for moving the line pointing cursor from one character region to another adjacent character region; and line ruler for displaying a line on one or more of the line regions corresponding to a trace of the arrowhead when the line pointing cursor is moved by the cursor controller.

Another feature of the invention is a word processor with, besides the aforementioned display, a printer for printing characters and plural kinds of line, further including:

display controller for displaying a character or a line pointing cursor in one of the character regions, the line pointing cursor having a shape of an arrow with an arrowhead for pointing at one corner of the one of the character region and with a line-type display portion in which a line structure of one kind of rule to be printed by the printer is displayed;

cursor controller for moving the line pointing cursor from one character region to another adjacent character region; and line ruler for displaying a line on one or more of the line regions corresponding to a trace of the line pointing cursor when the line pointing cursor is moved by the cursor controller.

BRIEF DESCRIPTION OF THE DRAWINGS

The present invention will be described in more detail with examples and reference to the accompanying drawings, in which.

DETAILED DESCRIPTION OF THE PREFERRED EMBODIMENT

Figure 2:
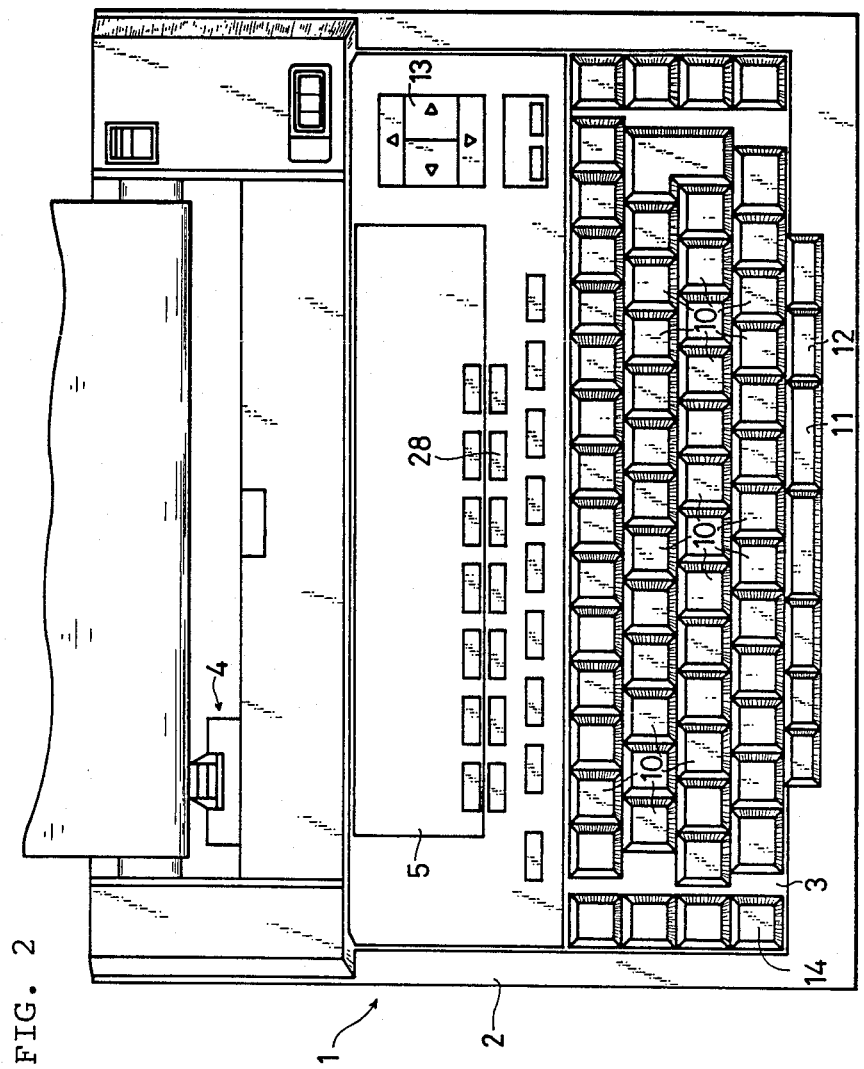
FIG. 2 is a plan view of a Japanese word processor embodying the invention.

A Japanese word processor embodying the present invention will be described in detail hereinafter according to the drawings. Referring to FIG. 2, a frame 2 of a word processor 1 has a keyboard 3 on the front and a printer 4 on the rear thereof. On the keyboard 3 there is a liquid crystal display (LCD) 5 for displaying plural lines of text thereon. Each line of the LCD 5 consists of forty square character regions 6. A character region 6 for displaying a single character or symbol therein consists of sixteen by sixteen dot-matrix of pixels. As shown in detail in FIG. 8, a horizontal line region 7 of one-pixel-width extends horizontally over the upper edge of character regions 6 in each line, and an underline region 8 of one-pixel-width extends horizontally under the lower edge of character regions 6 so as to be used mainly for underlining the character within the character region 6. The underline region 8 is adjacent to the horizontal line region 7 of the character region 6 in the next line. A line of one-pixel-width on the right edge within the character region 6 is a vertical line region 9. The horizontal line region 7 and the vertical line region 9 are used when a line is ruled, respectively, horizontally and vertically.

Referring to FIG. 2 again, the keyboard 3 is provided with various keys such as: character keys 10 for inputting alphabets, kana characters, numerals, etc.; a kanji conversion key 11; a next-suggestion key 12; cursor keys 13; a line ruler mode selector key 14; a print key 28 and so forth. The cursor keys 13 are used for moving a cursor displayed on the LCD 5. The line ruler mode selector key 14 is used to select a mode alternately between a text input mode and a line ruler mode. The Japanese language is written by a combination of tens of thousands of different ideograms, namely, kanji characters, and tens of phonograms, namely, kana characters. The number of kanji is so huge that it is mechanically impossible to provide a Japanese word processor with character keys for those kanji characters, and instead the word processor 1 is provided with kana character keys belonging to the character keys 10. However, since it is hard to read and understand the sentences which are made of exclusively kana characters, i.e., the phonograms, the text input by the kana character keys has to be converted into an ordinary Japanese which is optionally composed of kana and kanji characters so as to be readable. Thus, the kanji conversion key 11 is used for converting a group of the input kana characters into an appropriate group of kanji or kanji-kana-mixed characters, and for displaying this on the LCD 5. In Japanese, however, there are many different words that sound the same. If an unsuitable group of kanji or kanji-kana-mixed characters is suggested on the display 5 by a press of the kanji conversion key 11, the next-suggestion key 12 is used for displaying other homonyms in the text input mode. On the other hand, the next-suggestion key 12 is also used for selecting one kind of lines among various kinds of ruled line in the line ruler mode.

Figure 1:
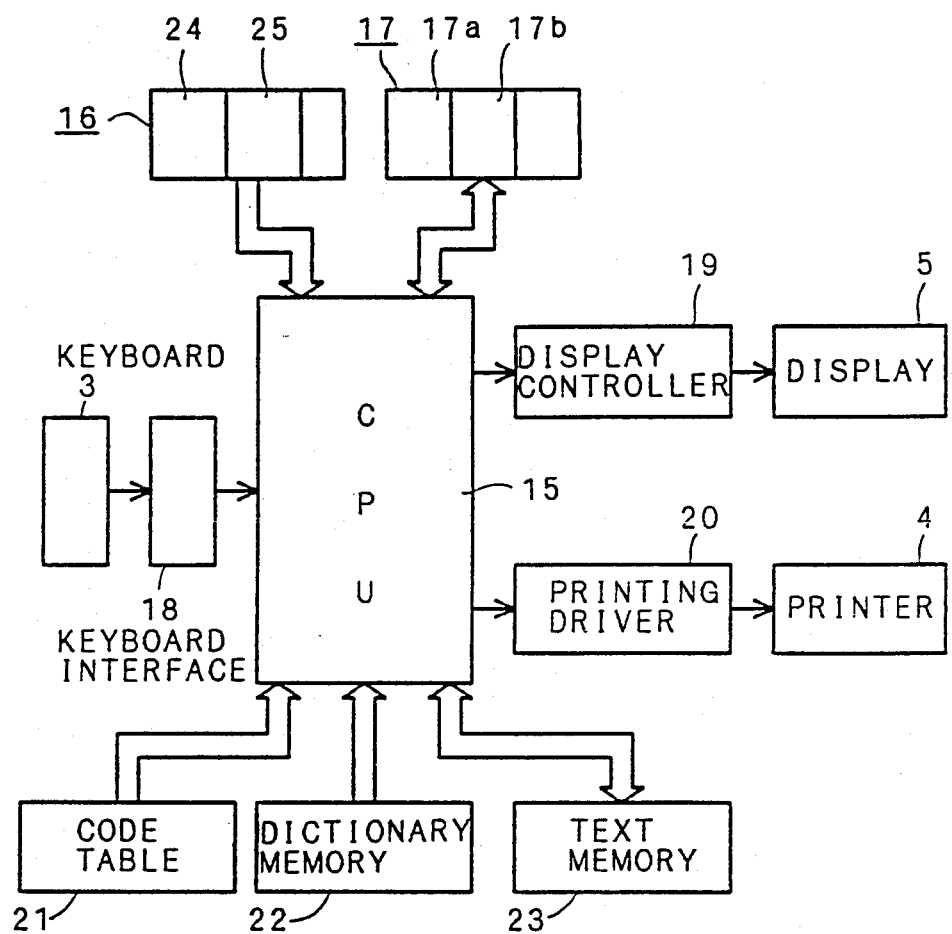
FIG. 1 is an electronic block diagram of an embodiment of the invention.

The electric system of the word processor 1 will be explained referring to the electronic block diagram shown in FIG. 1. A central processing unit (CPU) 15 for controlling display of the word processor 1 is installed in the frame 2. The CPU 15 is connected with a read only memory (ROM) 16 and a random access memory (RAM) which is used as a work memory 17. The work memory 17 includes a character input buffer 17a for temporarily storing inputted character data, and a ruled line input buffer 17b for temporarily storing line ruler data such as line selection and position data inputted by the cursor keys 13 in the line ruler mode. The CPU 15 is connected with the keyboard 3 by way of a keyboard interface 18; with the liquid crystal display 5 by way of a display controller 19; with the printer 4 by way of a printing driver 20; and with various memories such as a code table memory 21, a kanji dictionary memory 22, and a document memory 23.

The ROM 16 includes a program memory 24 and a character generator 25. The program memory 24 stores a Japanese word processor control program for generally operating the word processor 1, a line ruler control program, a keyboard control program, a printer control program, an LCD control program, and others so that the CPU 15 operates according to those control programs. The character generator 25 stores character pattern data which consists of character code of characters and symbols which are displayed or printed out by dot matrix.

The kanji dictionary memory 22 stores data such as a kana-to-kanji conversion table from which kanji character data and kana character data are read out optionally in conversion of kana characters into kanji or kanji-kana-mixed characters. The code table 21 stores character codes for each character and symbol. The document memory 23 stores character data which consists of character code that the operator inputs from the character keys 10 on the keyboard 3.

Hereinafter, the functions of the aforementioned word processor 1 will be described. When the operator presses a character key 10 on the keyboard 3 so as to enter a text, the CPU 15 judges which key is pressed according to the keyboard control program and by reference to the code table 21, and then converts the input signal generated by the pressed character key 10 into a corresponding character data so as to store the character data, one after another, in the character input buffer 17a of the work memory 17. According to the LCD control program, the CPU 15 simultaneously reads out a plurality of the latest 0 inputted character data from the character input buffer 17a and displays this within the character regions 6 of the LCD 5 in order. The CPU 15 moves a cursor from one character region to the next as one character is input from the keyboard 3 so that the cursor is normally displayed on an underline region 8 just below the character region 6 where the next input character should be displayed.

When the operator moves the cursor by the cursor keys 13 to the end of a group of inputted kana characters and depresses the kanji conversion key 11 in order to convert the group of kana characters into a group of kanji or kanji-kana-mixed characters, the CPU 15 accordingly first reads out the group of kana characters corresponding to the address of the cursor from the character input buffer 17a. The CPU 15 thereafter converts the group into an appropriate group of kanji or kanji-kana-mixed characters with reference to the kanji dictionary memory 22, and then stores this in the character input buffer 17a replacing the kana characters so as to display it on the LCD 5.

When the print key 28 is depressed, the CPU 15 controls the printer 4 according to the printer control program so as to print out the characters or ruled lines corresponding to the data stored in the work memory 17.

Figure 3A:
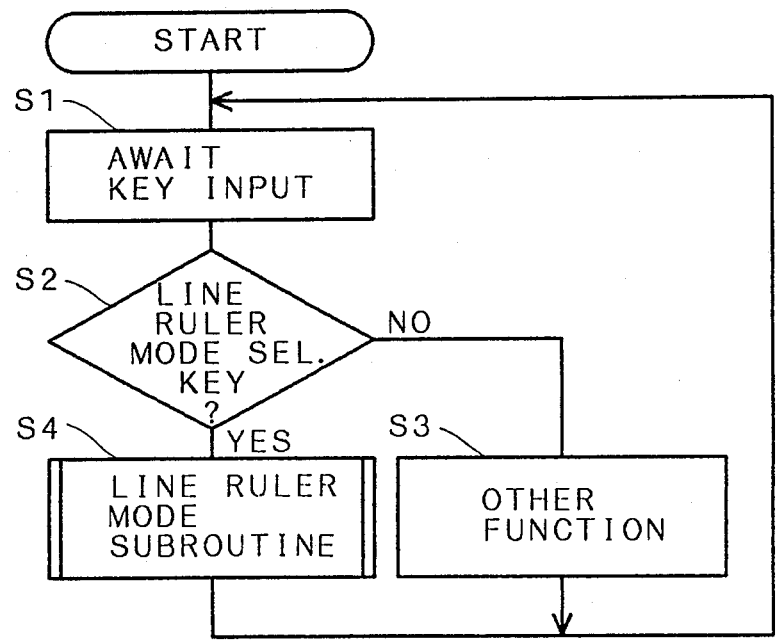
FIGS. 3A and 3B are flow charts of processings executed by the CPU of the embodiment.
Figure 3B:
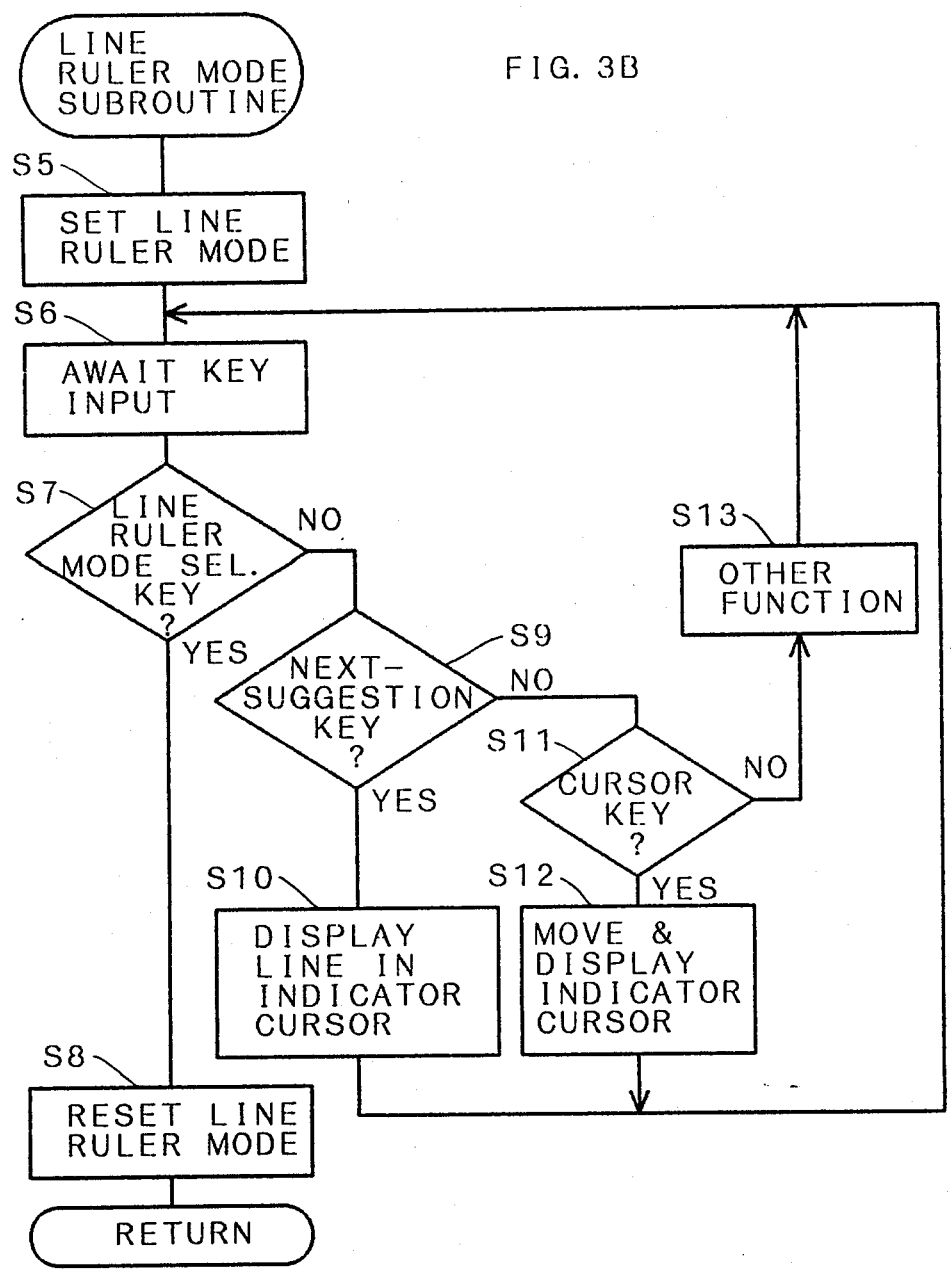

The processing steps to input a ruled line in a text will now be explained referring to the flowcharts in FIGS. 3A and 3B. When the operator depresses the line ruler mode selector key 14 to switch the text input mode into the line ruler mode, the CPU 15, which has been awaiting a keyed signal at step S1, determines at the following decision point S2 according to the keyboard control program if the depressed key is the line ruler mode selector key 14. If the answer is NO, the program proceeds to step S3 where another function is actuated, such as editing of a text or printing based on the work memory 17, and then it returns to step S1. If the answer is YES at decision point S2, on the other hand, the CPU 15 performs a line ruler mode subroutine according to the line ruler control program at step S4.

Figure 8:
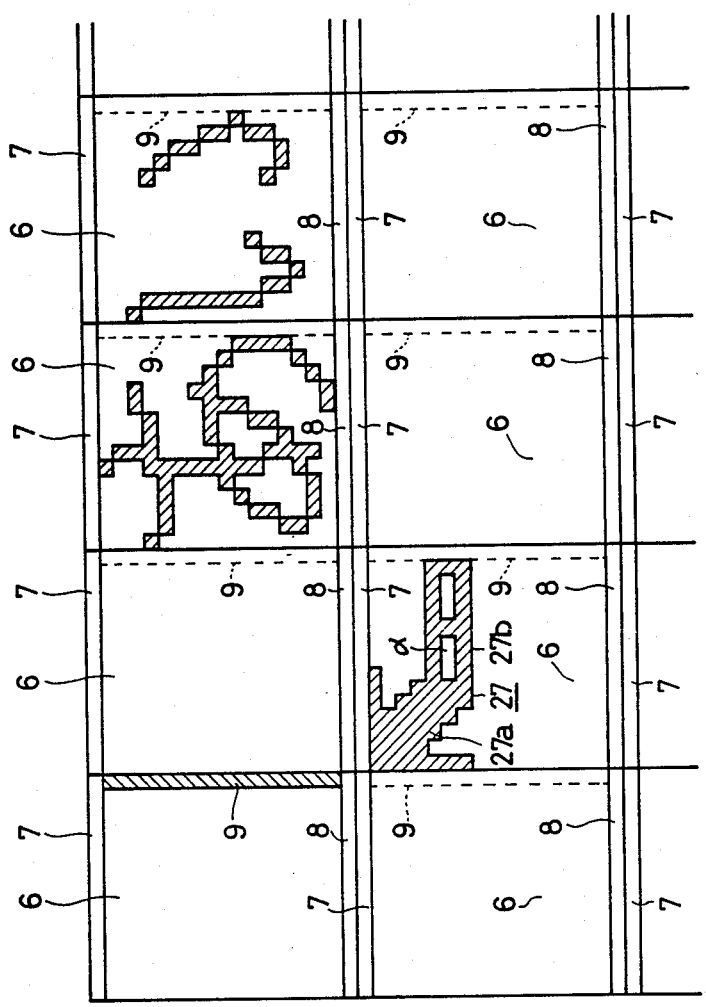
FIG. 8 is an enlarged plan view of a part of the liquid crystal display displaying the characters and the line pointing cursor with a dotted line indicated in its body portion in the line ruler mode.

The line ruler mode subroutine will be explained in detail according to the flowchart in FIG. 3B. When this subroutine is started, the CPU 15 sets the line ruler mode at step S5, that is, the cursor which has been displayed within the underline region 8 in the text input mode is changed into a line pointing cursor 27 displayed on the upper half of the same character region 6 under which the underline cursor has been located when the text input mode was switched into the line ruler mode at step S1. As shown in FIG. 8, the line pointing cursor 27 consists of an arrowhead 27a and a body portion 27b. The arrowhead 27a slants upwards so as to point the left upper corner of a character region 6 and indicate the starting point of a ruled line. The body portion 27b has a section indicating to the operator which kind of line is to be printed by the printer 4. The CPU 15 waits at step S6 until the operator presses a key. At the following decision point S7 the CPU 15 determines whether the pressed key is the line ruler mode selector key 14. If the answer is YES, the line ruler mode is reset at step S8 and the program returns to step S1, entering into the text input mode.

Figure 9:
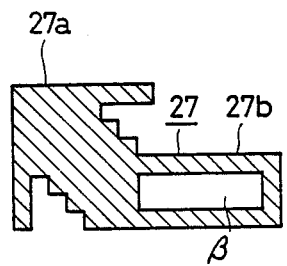
FIG. 9 is an enlarged picture of the line pointing cursor with a thick line indicated in the body portion.
Figure 10:
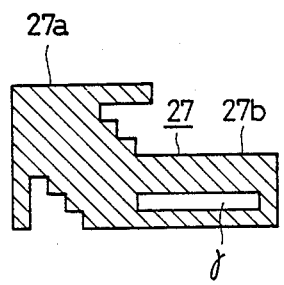
FIG. 10 is an enlarged picture of the line pointing cursor with a thin line indicated in the body portion.

On the other hand, if the answer at decision point S7 is NO, the program proceeds to decision point S9 where it is determined if the key pressed at step S6 is the next suggestion key 12. If the operator presses the next suggestion key 12 at step S6 in order to select a kind of ruled line, the answer at decision point S9 is YES and the program proceeds to step S10 where the CPU 15 displays in the body portion 27b of the line pointing cursor 27 a structure of ruled line; such as a dotted line α shown in FIG. 8, a thick line β shown in FIG. 9, and a thin line γ in FIG. 10, sequentially with every press of the next-suggestion key 12. After step S10, the program then returns to step S6.

If the operator presses the cursor keys 13 at step S6, NO results at both the decision points S7 and S9, and YES at the following decision point S11. At the following step S12, the CPU 15 controls display of a line as follows. First, the CPU 15 moves the line pointing cursor 27 from one character region to the other according to cursor movement commands input from the cursor keys 13. In the character region 6 where any character or symbol is already displayed, the former character or symbol is replaced by the line pointing cursor 27. In moving the cursor, the CPU 15 simultaneously generates the location data of the ruled line with the address data of the character region 6 where the line pointing cursor 27 is displayed. The location data and a data of the line selection make up a line ruler data, which is stored in the ruled line input buffer 17b for every movement of the line pointing cursor 27 in character regions 6. The CPU 15 displays a ruled line within either the horizontal line regions 7 or the vertical line regions 9 according to the line ruler data stored in the ruled line input buffer 17b. The line is displayed on the horizontal line region 7 when the line pointing cursor 27, i.e. arrowhead 27a moves horizontally in the character regions 6, and is displayed in the vertical line region 9 when the line pointing cursor 27 moves vertically.

If the operator presses any key other than the line ruler mode selector key 14, the next-suggestion key 12, or the cursor keys 13 at step S6, the program proceeds to step S13 to actuate another function.

Figure 4:
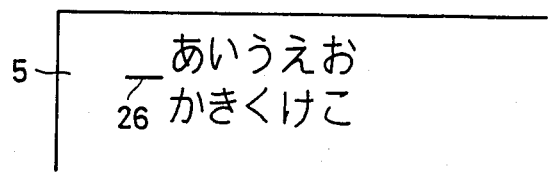
FIGS. 4, 5, 6 and 7 show how lines are ruled on the liquid crystal display.
Figure 5:
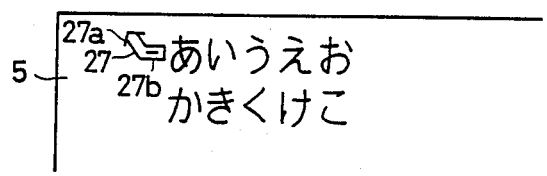
Figure 6:
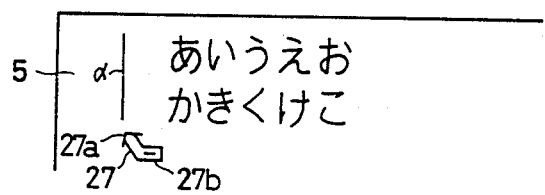
Figure 7:
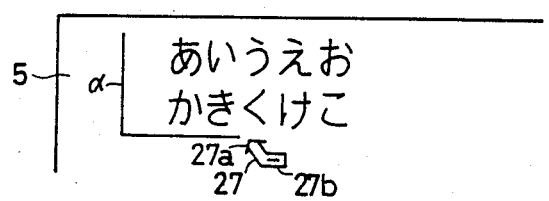

Hereinafter, a more concrete example when the operator inputs a line in a text will be given referring to the flowcharts in FIGS. 3A and 3B and the drawings in FIGS. 4 through 10. If the operator presses the line ruler mode selector key 14 in the text input mode (step S1), the word processor 1 is switched to the line ruler mode (step S5) and a cursor 26 which has been displayed as illustrated in FIG. 4 is turned into the line pointing cursor 27 illustrated in FIG. 5. The operator presses the next-suggestion key 12 (step S6) until a dotted line α is selected and displayed in the body portion 27b of the line pointing cursor 27 (step S10). When the operator twice presses the cursor key 13 indicated by a downward pointing arrow on the keyboard 3 in order to move the line pointing cursor 27 vertically down (step S6), the CPU 15 moves the line pointing cursor 27 by two character regions. According to the cursor movement commands from the cursor key 13 the CPU 15 also displays a solid thin line in the vertical line region 9, following the trace of the line pointing cursor 27 as illustrated in FIGS. 6 and 8. On the other hand, when the operator thrice presses the cursor key 13 indicated by a rightward pointing arrow on the keyboard 3 in order to move the line pointing cursor 27 rightwards, the CPU 15 moves the line pointing cursor 27 by three character regions. According to the cursor movement commands from the cursor keys 13, the CPU 15 also displays a solid thin line in the horizontal line region 7 over the character regions 6, following the trace of the line pointing cursor 27 as illustrated in FIG. 7. Although the line is displayed by a solid thin line on the display 5 even when the operator inputs a dotted line α, as described above, the desired dotted line α is printed out by pressing the print key 28 since the data of the kind of line is stored in the ruled line input buffer 17b.

Since the line pointing cursor 27 points with the arrowhead 27a at the exact place where a line is ruled on the liquid crystal display 5, it prevents the operator from inputting a line in a wrong place of the text. The line pointing cursor 27 also indicates in the body portion 27b thereof a structure of line type which will be printed out by the printer 4. Therefore, it prevents the operator from inputting an undesired line.

In the aforementioned embodiment, the word processor 1 is designed to display a solid thin line on the liquid crystal display 5 for all the kinds of line which will be printed out in its respective form. However, it may be designed to display every kind of line on the display 5. For example, in case of ruling a vertical thick line, it may be designed to display the thick line in a region of two-pixel-width made of a vertical line region 9 of one-pixel-width and a left vertical edge of one-pixel-width of the character region 6 adjacent to the vertical line region 9. In such a design, the body portion 27b of the line pointing cursor 27 is effective specifically at the starting point of a line, namely, at the stage shown in FIG. 5 to indicate to the operator which kind of line will be ruled.

Although, in the above embodiment, the vertical line region 9 is included in the character region 6, the line region can be provided separately like the horizontal line region 7. When the line regions are provided separately from the character region 6, each line region can be made of a single long segment on the LCD. In that case, the operator can check the structure of the ruled line in the body portion 27b of the line pointing cursor 27.

Obviously, many modifications and variations of the present invention are possible with regard to the above teachings. It is therefore to be understood that within the scope of the appended claims, the invention may be practiced other than as specifically described.

What is claimed is:

1. A word processor with a ruled line display function comprising a display having a plurality of rectangular character regions arranged vertically and horizontally and predetermined line regions on each edge of each said character region, each character region being able to display a character,
   display control means for displaying a character or a line pointing cursor in one of the character regions, said line pointing cursor having a shape of an arrow with an arrowhead for pointing at one corner of said one of the character regions and indicating intersecting locations of said predetermined line regions;
   cursor control means for moving said line pointing cursor from one character region to another adjacent character region; and
   line rule means for displaying a line on one or more of said predetermined line regions corresponding to a trace of said arrowhead when the line pointing cursor is moved by said cursor control means.

2. A word processor according to claim 1, wherein said display control means display said line pointing cursor in one of the character regions with priority to a character when said line pointing cursor is to be displayed in the character region where the character is already displayed.

3. A word processor according to claim 1, wherein:
   said word processor comprises a printer for printing characters and plural kinds of line; and
   said line pointing cursor displayed on said character region has a line-type display portion in which a line structure of one kind of line to be printed by said printer is displayed.

4. A word processor according to claim 1, wherein at least one of said predetermined line regions is included in said character region.

5. A word processor with a ruled line display function comprising
   a display having a plurality of rectangular character regions arranged vertically and horizontally and predetermined line regions on each edge of each said character region, each character region being able to display a character, and
   a printer for printing characters and plural kinds of lines,
   said word processor further comprising:
   display control means for displaying a character or a line pointing cursor in one of the character regions, said line pointing cursor, for indicating one of the character regions and indicating intersecting locations of said predetermined line regions, having a line-type display portion in which a line structure of one kind of line to be printed by said printer is displayed;
   cursor control means for moving said line pointing cursor from one character region to another adjacent character region; and
   line rule means for displaying a line on one or more of said predetermined line regions corresponding to a trace of said line pointing cursor when the line pointing cursor is moved by said cursor control means.

6. A word processor according to claim 5, wherein said display control means display said line pointing cursor in one of the character regions with priority to a character when said line pointing cursor is to be displayed in the character region where the character is already displayed.

7. A word processor according to claim 5, wherein at least one of said predetermined line regions is included in said character region.

* * * * *